United States Patent
Su et al.

(10) Patent No.: US 11,474,803 B2
(45) Date of Patent: Oct. 18, 2022

(54) METHOD AND SYSTEM FOR DYNAMIC UPGRADE PREDICTIONS FOR A MULTI-COMPONENT PRODUCT

(71) Applicant: EMC IP Holding Company LLC, Hopkinton, MA (US)

(72) Inventors: Lihui Su, Shanghai (CN); Scott Zhang, Shanghai (CN); Zak Liang, Shanghai (CN); James Morton, Adamstown, MD (US); Roger Hongyi Che, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 201 days.

(21) Appl. No.: 16/730,310

(22) Filed: Dec. 30, 2019

(65) Prior Publication Data
US 2021/0200526 A1 Jul. 1, 2021

(51) Int. Cl.
*G06F 8/65* (2018.01)
*G06Q 30/02* (2012.01)
*G06N 5/04* (2006.01)

(52) U.S. Cl.
CPC ............ *G06F 8/65* (2013.01); *G06N 5/04* (2013.01); *G06Q 30/0282* (2013.01)

(58) Field of Classification Search
CPC ......... G06F 8/65; G06N 5/04; G06Q 30/0282
See application file for complete search history.

(56) References Cited

U.S. PATENT DOCUMENTS

| | | | |
|---|---|---|---|
| 8,261,283 B2 * | 9/2012 | Tsafrir | G06F 9/5066 718/107 |
| 2006/0130042 A1 * | 6/2006 | Dias | G06F 9/5083 717/168 |
| 2007/0294684 A1 * | 12/2007 | Kumashiro | G06F 8/65 717/168 |
| 2013/0151421 A1 * | 6/2013 | Van Der Ploeg | G06Q 10/06 705/301 |
| 2013/0179877 A1 * | 7/2013 | Dain | G06F 8/60 717/177 |
| 2016/0103673 A1 * | 4/2016 | Curran | H04L 67/34 717/168 |
| 2017/0115978 A1 * | 4/2017 | Modi | G06F 8/65 |
| 2019/0259223 A1 * | 8/2019 | Sangameswaran | G07C 5/0841 |
| 2020/0102185 A1 * | 4/2020 | Marpu | G06F 8/65 |
| 2021/0004000 A1 * | 1/2021 | Kalaskar | G06F 8/65 |
| 2021/0083950 A1 * | 3/2021 | Bentley | H04L 41/5025 |

* cited by examiner

*Primary Examiner* — Daxin Wu
(74) *Attorney, Agent, or Firm* — Womble Bond Dickinson (US) LLP (57) ABSTRACT

Techniques are disclosed for generating a dynamic upgrade prediction. The prediction includes generating an initial upgrade prediction for an upgrade to be performed on a subset of component nodes; performing a real time progress review, using a centralized management node, of the upgrade, wherein each of the component nodes includes a number of stages; performing an upgrade duration comparison between the initial upgrade prediction and a real time upgrade time for a subset of the stages; and generating an updated upgrade prediction for the multi-component product upgrade based on the comparison between the initial upgrade prediction and the real time upgrade time.

14 Claims, 5 Drawing Sheets

METHOD AND SYSTEM FOR DYNAMIC UPGRADE PREDICTIONS FOR A MULTI-COMPONENT PRODUCT

FIELD OF THE INVENTION

Embodiments of the present invention relate generally to data storage systems. More particularly, embodiments of the invention relate to generating dynamic upgrade predictions for multi-component products.

BACKGROUND

Products that contain several component products and provide an integrated service to end users may have a multi-component structure. Some products predefine a total upgrade time, along with the percentages for each stage. However, such approaches may not be suitable for multi-component products.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a computer implemented method of generating a dynamic upgrade prediction is disclosed. The method includes generating an initial upgrade prediction for an upgrade to be performed on a subset of component nodes; performing a real time progress review, using a centralized management node, of the upgrade, wherein each of the component nodes includes a number of stages; performing an upgrade duration comparison between the initial upgrade prediction and a real time upgrade time for a subset of the stages; and generating an updated upgrade prediction for the multi-component product upgrade based on the comparison between the initial upgrade prediction and the real time upgrade time. In some embodiments, only a subset of the component nodes of the multi-component product are being upgraded, and the initial upgrade prediction is generated based on an analysis of the subset of component nodes. In some embodiments, the initial upgrade prediction, Tinit, is generated according to equation (1), wherein M is a number of components of the multi-component product, and each component has N[m] stages.

$$T_{init} = \sum_{m=1}^{M} \sum_{m=1}^{N[m]} T[m][n] \quad (1)$$

In some embodiments, the updated upgrade prediction, Testimate, is generated according to equation (2), wherein component x and stage y are being upgraded, and $\Delta t_{xy}$ is an elapsed time since beginning stage y.

$$T_{estimate} = \quad (2)$$
$$\begin{cases} T_{init} - \sum_{m=1}^{x}\sum_{n=1}^{y} T[m][n] + T[x][y] - \Delta t_{xy}, & \Delta t_{xy} \le T[x][y] \\ T_{init} - \sum_{m=1}^{x}\sum_{n=1}^{y} T[m][n] + \Delta t_{xy} * 1.1 - \Delta t_{xy}, & T[x][y] < \Delta t_{xy} < T\max[x][y] \end{cases}$$

In some embodiments, the updated upgrade prediction is dynamically increased when the real time progress review indicates that one of the stages spends more time than the initial upgrade prediction. In some embodiments, the initial upgrade prediction for the multi-component product is generated based on internal testing data or customer feedback.

According to another aspect, the present disclosure relates to a system for generating a dynamic upgrade prediction. The system includes a multi-component product including a centralized management node and a number of component nodes. The centralized management node is configured to communicate with the component nodes generate an initial upgrade prediction for an upgrade to be performed on a subset of the component nodes. The centralized management node is also configured to perform a real time progress review of the upgrade, wherein each of the component nodes includes a number of stages. The centralized management node is also configured to perform an upgrade duration comparison between the initial upgrade prediction and a real time upgrade time for a subset of the stages; and generate an updated upgrade prediction based on the comparison between the initial upgrade prediction and the real time upgrade time. In some embodiments, only a subset of the component nodes of the multi-component product are being upgraded, and the initial upgrade prediction is generated based on an analysis of the subset of component nodes. In some embodiments, the centralized management node generates the initial upgrade prediction, Tinit, according to equation (1), above, wherein M is a number of components of the multi-component product, and each component has N[m] stages. In some embodiments, the updated upgrade prediction, Testimate, is generated according to equation (2), above, wherein component x and stage y are being upgraded, and $\Delta t_{xy}$, is an elapsed time since beginning stage y. In some embodiments, the updated upgrade prediction is dynamically increased when the real time progress review indicates that one of the stages spends more time than the initial upgrade prediction. In some embodiments, the initial upgrade prediction for the multi-component product is generated based on internal testing data or customer feedback.

According to another aspect, the present disclosure relates to a non-transitory computer-readable medium storing instructions which, when executed by one or more processors, cause the one or more processors to perform dynamic upgrade prediction operation. The operation includes: generating an initial upgrade prediction for an upgrade to be performed on a subset of a number of component nodes; performing a real time progress review, using a centralized management node, of the upgrade, wherein each of the component nodes includes a number of stages; performing an upgrade duration comparison between the initial upgrade prediction and a real time upgrade time for a subset of the stages; and generating an updated upgrade prediction for the multi-component product upgrade based on the comparison between the initial upgrade prediction and the real time upgrade time. In some embodiments, only a subset of the component nodes of the multi-component product are being upgraded, and the initial upgrade prediction is generated based on an analysis of the subset of component nodes. In some embodiments, the initial upgrade prediction, Tinit, is generated according to equation (1), above, wherein M is a number of components of the multi-component product, and each component has N[m] stages. In some embodiments, the updated upgrade prediction, Testimate, is generated according to equation (2), above, wherein component x and stage y are being upgraded, and $\Delta t_{xy}$ is an elapsed time since beginning stage y. In some embodiments, the updated upgrade prediction is dynamically increased when the real time progress review indicates that one of the stages spends more time than the initial upgrade prediction. In some embodiments, the initial upgrade prediction for the multi-component product is generated based on internal testing data or customer feedback.

According to some embodiments, a predefined total upgrade time, along with percentages for each stage, can be generated and displayed to a user. For example, if the predefined upgrade time is 100 minutes, the whole upgrade process can be divided into four stages with percentages assigned to the various stages based on the expected time for each stage. Such a prediction, as the one shown below in Table 1, may be helpful for products with a single component, since the upgrade time and stages would be stable from version to version, and the percentage can be used to show a progress bar in a user interface (UI) and calculate remaining upgrade time. For example, in the embodiment illustrated in Table 1, when the upgrade reaches stage 3, the remaining time will be 60 minutes.

TABLE 1

| Stage 1 | 10% |
|---|---|
| Stage 2 | 30% |
| Stage 3 | 30% |
| Stage 4 | 30% |

According to another technique, an upgrade time can be generated and each stage can be assigned a weight. Based on the upgrade stage's time and weight, a remaining weight and time can be calculated. For example, the whole upgrade progress can be divided into four stages, as shown in Table 2. When stage 1 finishes after 10 minutes, one weight is completed, and the remaining weight is nine, resulting in an expected remaining time of 90 minutes. This technique does not require the total upgrade time to be predefined, and stages can be skipped during an upgrade. This technique can also factor in the deployment node's performance. For example, if one stage is slow, it can deduce that the remaining stages may also be impacted.

TABLE 2

| Stage 1 | Weight 1 |
|---|---|
| Stage 2 | Weight 3 |
| Stage 3 | Weight 3 |
| Stage 4 | Weight 3 |

With multi-component products, however, it can be challenging to predict an overall upgrade time, since some components may not be deployed, which impacts the overall upgrade times. It can also be challenging to define or compare the weight of stages between different components. Different components are located on different nodes, so using one component's data to predict the data of another component can lead to unreliable upgrade time estimates. Furthermore, some components may need to stop running some tasks, thus upgrade time can vary considerably for each upgrade, even for the same component.

According to one embodiment, an estimation of the remaining upgrade time for a multi-component product can be generated based only on the components being upgraded. In some embodiments, a configuration file can be used to record the upgrade plan and record upgrade data based on the results from offline tests and experiments. The upgrade prediction can be estimated and updated dynamically, adjusting estimates based on actual runtimes for the particular components being upgraded. In some embodiments, this can improve operational efficiency for upgrade processes.

Figure 1:
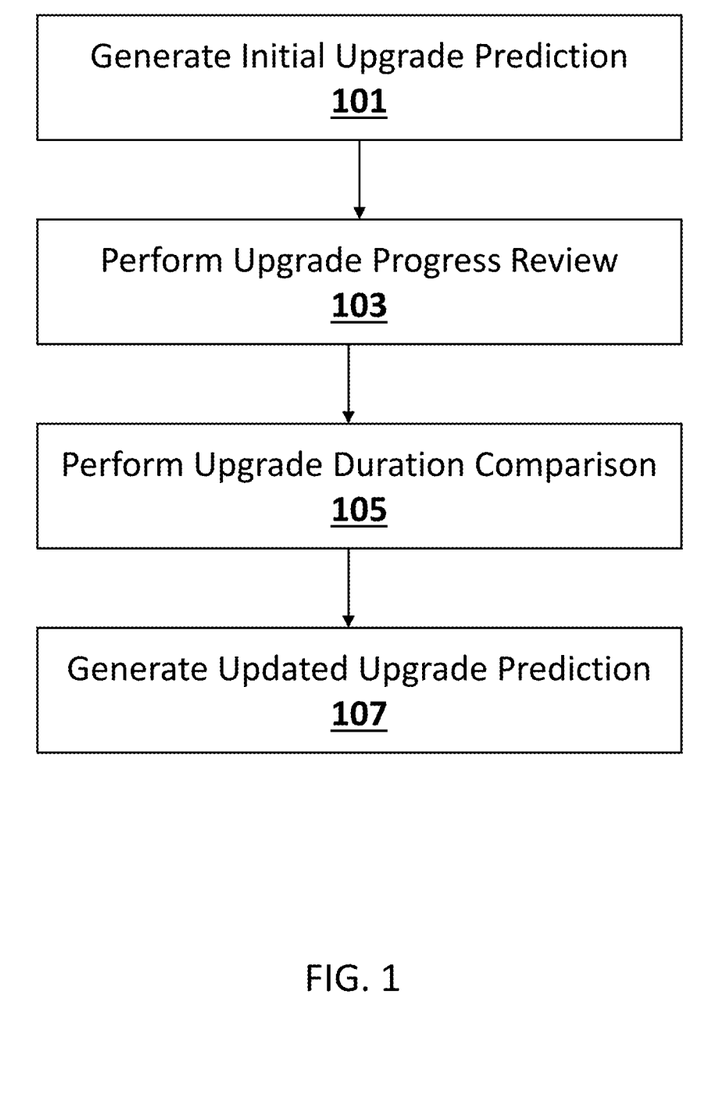
FIG. 1 shows a flow diagram of an example upgrade prediction process, according to one embodiment.

FIG. 1 shows a flow diagram of an example upgrade prediction process, according to one embodiment of the present disclosure. In operation 101, an initial upgrade prediction is generated. In some embodiments, a configuration file can be used to generate an initial upgrade prediction that is to be performed on a subset of a number of component nodes within a multi-component product. In some embodiments, only a subset of the component nodes of a multi-component product are being upgraded, and the initial upgrade prediction is generated based on an analysis of the subset being upgraded, rather than all the nodes within the multi-component product. In some embodiments, the initial upgrade prediction can be based on, for example, internal testing data or customer feedback. The initial upgrade prediction can be calculated, for example, based on equation (1) disclosed above.

In some embodiments, each node can include one or more stages, and the configuration file is a JSON formatted file describing the upgrade plan, with all components to be upgraded and the stages of each component. The components to be upgraded are dynamically configured before the upgrade begins, in some embodiments. An example JSON configuration file is presented below for illustrative purposes, wherein the "name" is the stage name, the "expect_time" T[m][n] is the estimated time expected to be spent on this stage measured in seconds, and the "max_time" Tmax [m][n] is a threshold time limit to report upgrade failure due to timeout.

```
{
    "components": [
        {
            "name": "Component_1",
            "stages": [
                {
                    "name": "Stage_1_1",
                    "expect_time": T[1][1],
                    "max_time": Tmax[1][1]
                },
                {
                    "name": "Stage_1_2",
                    "expect_time": T[1][2],
                    "max_time": Tmax[1][2]
                },
                ...
            ]
        },
        {
            "name": "Component_m",
            "stages": [
                ...,
                {
                    "name": "Stage_m_n",
                    "expect_time": T[m][n],
                    "max_time": Tmax[m][n]
                }
            ]
        }
    ]
}
```

In operation 103, an upgrade progress review is performed of the components being upgraded. As discussed above, the dynamic upgrade prediction disclosed herein is based on the components actually being upgraded, rather than all components or nodes of a multi-component product. In some embodiments, the progress review can be performed by a centralized management node of the multi-component product.

In operation 105, a comparison is done between the initial upgrade prediction and a real time upgrade time that is returned for one of the components being upgraded.

In operation 107, an updated upgrade prediction is generated based on the comparison in operation 105. In some embodiments, the updated upgrade prediction can be calculated according to equation (2), discussed above.

Figure 2:
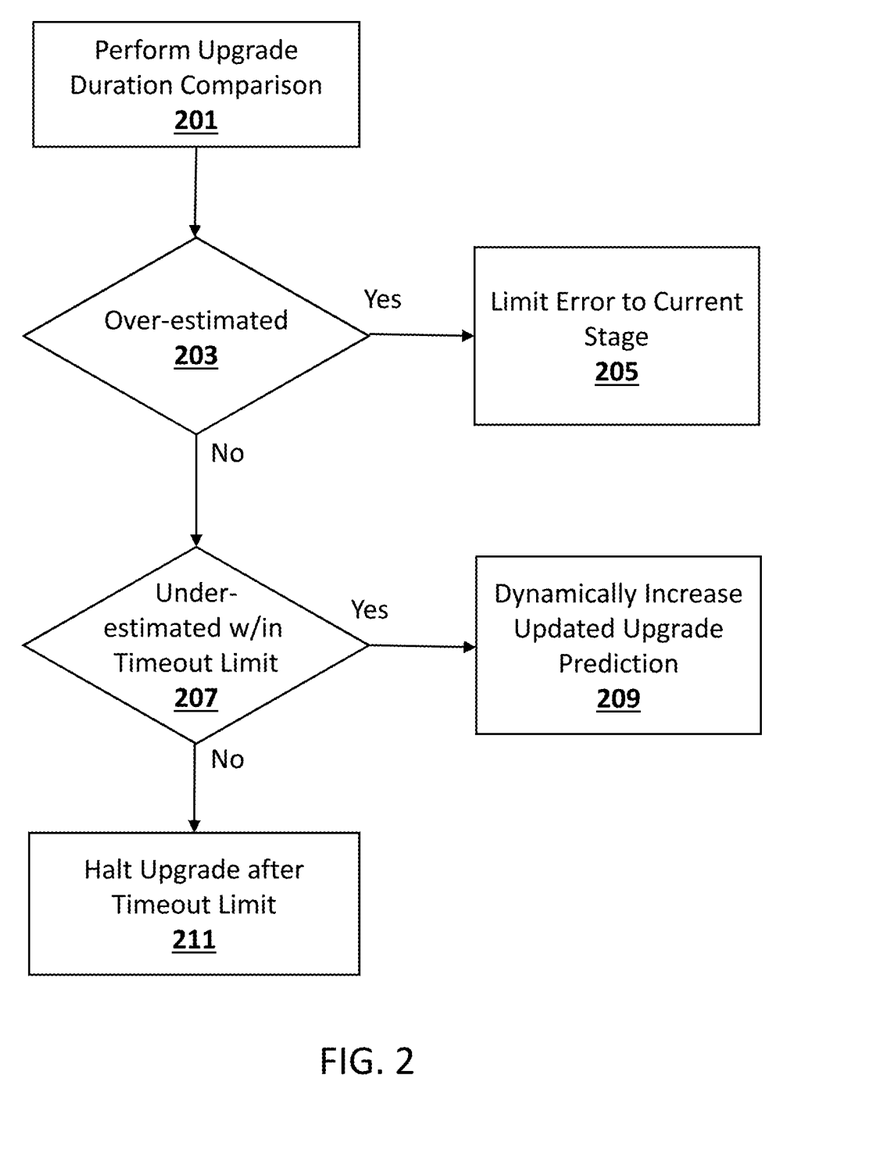
FIG. 2 shows a flow diagram of another example upgrade prediction process, according to one embodiment.

FIG. 2 shows a flow diagram of another example upgrade prediction process, according to one embodiment of the present disclosure. In operation 201, a comparison is done between the initial upgrade prediction and a real time upgrade time that is returned for one of the components being upgraded.

In operation 203, it is determined whether the initial upgrade prediction is an overestimation of the measured upgrade time. If the initial upgrade prediction is an overestimation, or when a particular stage spends less time than expected upgrading that stage, the error is limited to the current stage in operation 205. This limiting of an overestimation to the current stage is based on the knowledge that, for example, configuration issues or manual operator actions can significantly reduce upgrade times in some embodiments. Thus, the remaining time for the entire upgrade is recalculated, but this unexpected increase in upgrade speed does not affect the stages already performed or the stages not yet performed.

In operation 207, it is determined whether the initial upgrade prediction is an underestimation of the measured upgrade time. If the initial upgrade prediction is an underestimation, or when a particular stage takes more time than expected upgrading that stage, the future estimation for other stages—and particularly for stages located on the same component or node—is dynamically increased in operation 209. In some embodiments, the estimations are dynamically increased according to a fixed ratio. For example, the estimations can be dynamically increased by a fixed ratio of 1:1. The underestimation operation 207 is limited by a timeout threshold or limit, such that if the stage takes far more time than expected and surpasses the timeout limit, the upgrade is halted in operation 211, at least for that particular stage.

Figure 3:
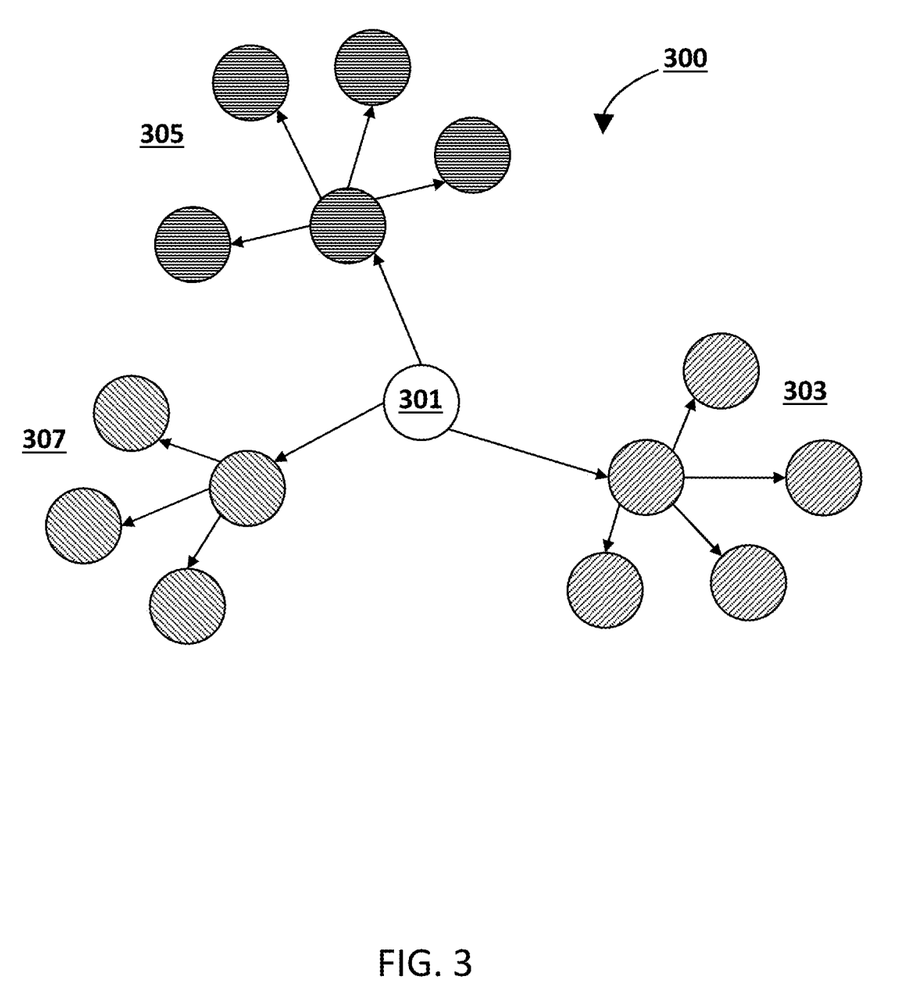
FIG. 3 shows a diagram of an example multi-component product, according to one embodiment.

FIG. 3 shows a diagram of an example multi-component product 300, according to one embodiment. In this example embodiment, multiple components or nodes 301, 303, 305, and 307 can be included within the multi-component product 300. In some embodiments, each component is independent and has its own release version and upgrade flow. Each of the components 303, 305, and 307 can be a single node or a cluster of nodes, in various embodiments. In this example embodiment, a master component 301 provides a centralized function to manage other components 303, 305, and 307 within the multi-component product 300.

This type of multi-component structure can provide an integrated service to end users, and can hide details of the sub-components, thus providing an integrated product experience for customers. With a simplified end-user operation, unified deployment and upgrade is also desirable.

In some embodiments, only displaying an upgrade progress bar or an upgrade percentage can be challenging for the user to understand. According to the techniques described herein, an estimated remaining upgrade time for the various nodes of a multi-component product is provided. Note that although user the master component 301 is shown as a single node, it can represent one or more machines that are connected to a network. In some embodiments, the various components described in reference to FIG. 3 can be combined in different configurations.

Figure 4:
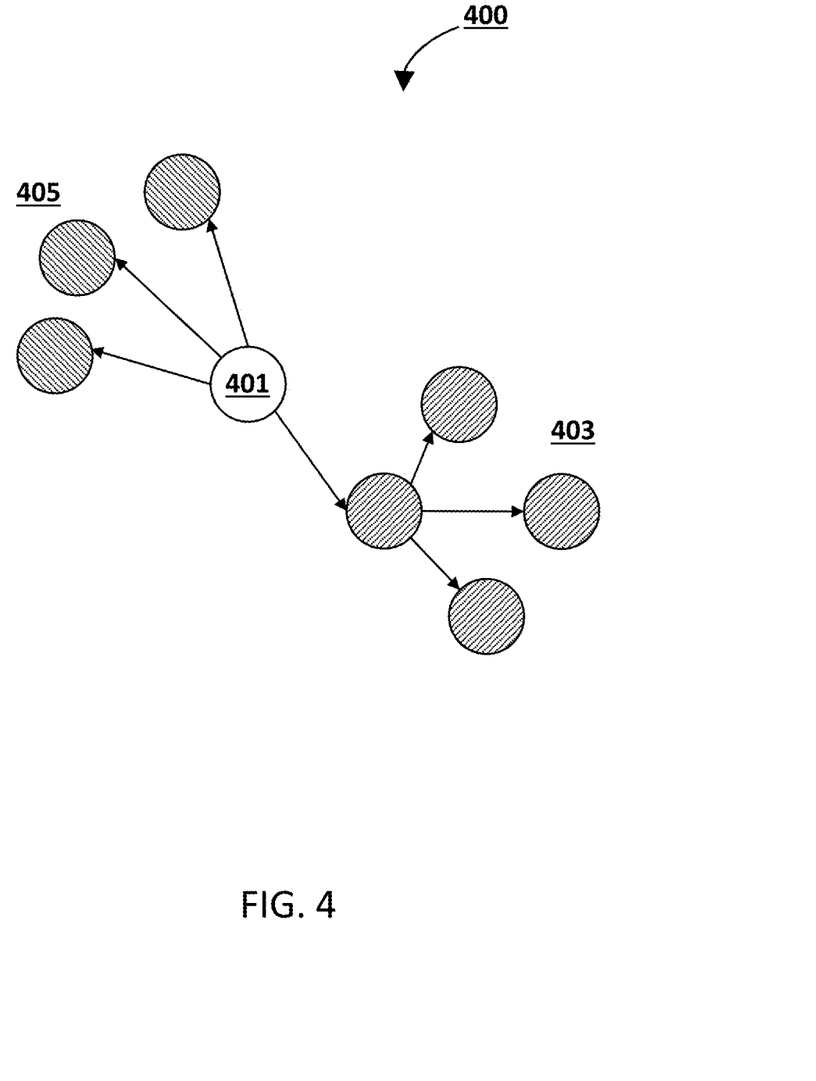
FIG. 4 shows a diagram of another example multi-component product, according to one embodiment.

FIG. 4 shows a diagram of another example multi-component product 400, according to one embodiment. In this example embodiment, multiple components, or nodes 403 and 405, can be in communication with or connected with a master component 401. The master component 401 can be, for example, a data model component which orchestrates interactions between the other components. One skilled in the art will recognize that additional components can be added to the multi-component product 400, and the present disclosure is not limited to the specific components illustrated in FIG. 4. The component nodes 403 can include virtual cluster filesystem (VCF) components or VSO components, while the component nodes 405 can include vProxy components. In some embodiments, vProxy components provide the capability to get data source from virtual machines (VMs), while VSO components provide the capability to store backup data. PPDM components can provide a UI to allow end customers to configure a backup policy, choose a data source to backup, and choose a target storage to store the backups, in some embodiments. Note that although user the master component 401 is shown as a single node, it can represent one or more machines that are connected to a network. In some embodiments, the various components described in reference to FIG. 4 can be combined in different configurations.

In one example embodiment, an upgrade configuration file containing PPDM and VSO components can estimate an upgrade time, showing a calculation of remaining upgrade time at the beginning of the upgrade, and during the upgrade. An example upgrade configuration file is shown below:

```
"components": [
    {
        "name": "PPDM",
        "stages": [
            {
                "name": "Initializing Upgrade",
                "time": 10
            },
            {
                "name": "Waiting for Tasks to Complete",
                "time": 30
            },
            {
                "name": "Taking Appliance Backup",
                "time": 180
            },
            {
                "name": "Shutting Down Components",
                "time": 60
            },
            {
                "name": "Updating The RPMs",
                "time": 120
            },
            {
                "name": "Rebooting The Appliance",
                "time": 45
            }
        ]
    },
    {
        "name": "VSO",
        "stages": [
            {
                "name": "VCM Upgrading",
                "time": 480
            },
            {
                "name": "VCF Upgrading",
                "time": 600
            }
        ]
    }
]
```

In another example embodiment an initial upgrade time estimation $T_{init}$ is calculated according to equation (3):

$$T_{init}=10+30+180+60+120+45+480+600=1525 \quad (3)$$

Supposing the upgrade is now upgrading in stage "Taking Appliance Backup" from the upgrade fact file, the last line indicating the upgrade stage is: upgrade_stage=PPDM,Taking Appliance Backup,2019-06-13T10:00:00,19 and now the system time is: 2019-06-13T10:00:30. This means that it has been 30 seconds since the beginning of the current stage. Therefore, the estimated remaining upgrade time can be calculated according to equation (4):

$$T_{estimate}=1525-(10+30+180)+180-30=1455 \quad (4)$$

If the initial upgrade time estimation $T_{init}$ is 1525, supposing the upgrade is now at stage "Shutting Down Components." From the upgrade fact file, the last line indicating the upgrade stage is: upgrade_stage=PPDM,Shutting Down Components,2019-06-13T10:05:00,29 and now the system time is 2019-06-13T10:06:30. This means that it has been 90 seconds since the start of the current stage, which is more than the 60 seconds initially estimated for this stage. Then the estimated remaining upgrade time can be calculated according to equation (5):

$$T_{estimate}=1525-(10+30+180+60)+90*1.1-90=1254 \quad (5)$$

Figure 5:
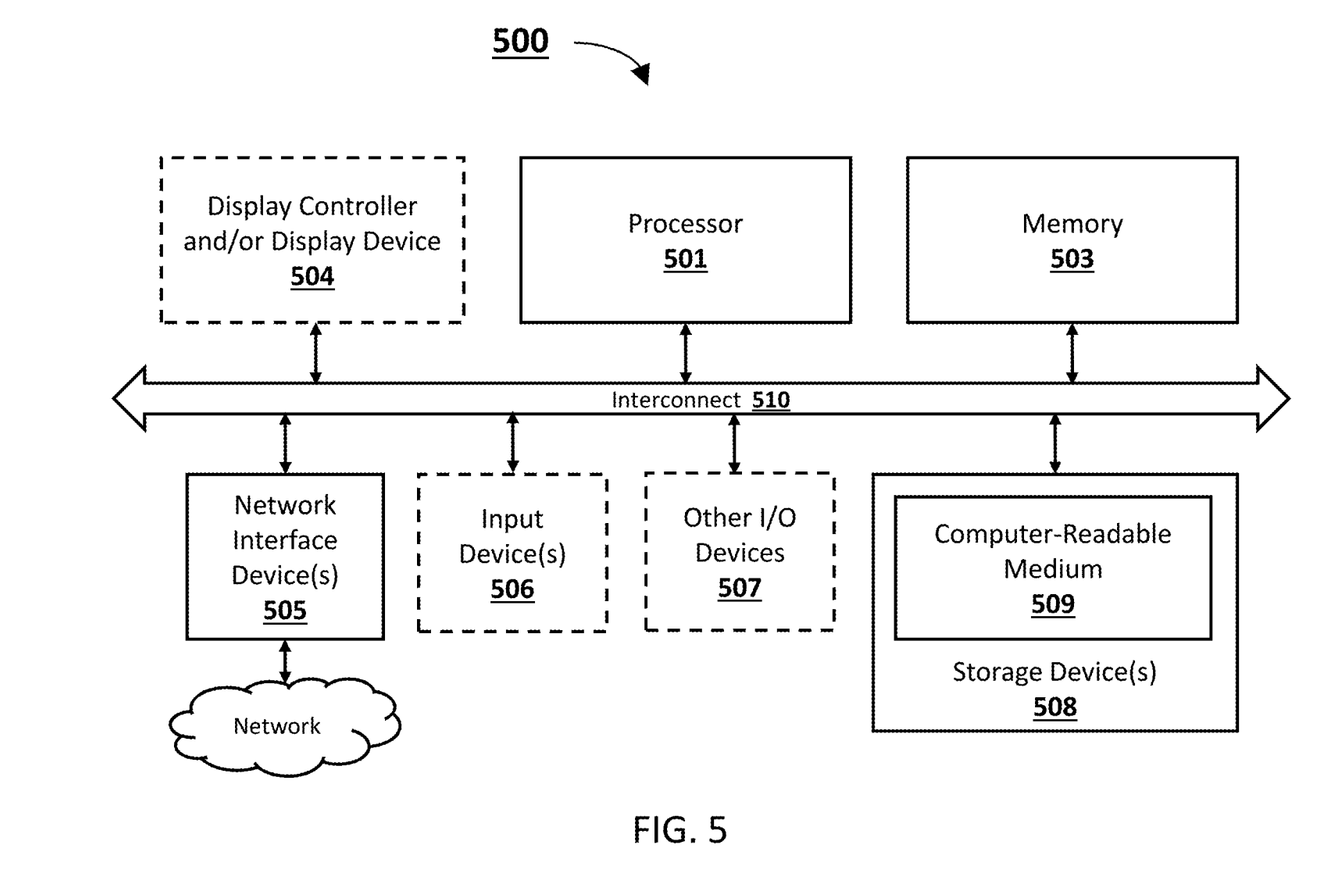
FIG. 5 is a block diagram illustrating a data processing system according to one embodiment.

FIG. 5 is a block diagram illustrating an example of a data processing system 500 that may be used with embodiments described herein. The data processing system 500 may represent any of the data processing systems described above and may perform any of the processes or methods described above. The data processing system 500 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 500 is intended to show a high-level view of many components of the computer system. However, it is to be understood that additional components may be present in certain implementations and furthermore, different arrangement of the components shown may occur in other implementations. The data processing system 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 500 includes one or more processor(s) 501, memory 503, network interface devices, 505, I/O devices, 506, 507 and storage device(s) 508 connected via a bus or an interconnect 510. In some embodiments, the memory 503 can store one or more modules that can implement one or more of the processes or methods described herein. The one or more processor(s) 501 may be a single processor or multiple processors with a single processor core or multiple processor cores included therein. The processor(s) 501 may represent one or more general-purpose processors such as a microprocessor, a central processing unit (CPU), or the like. More particularly, the processor(s) 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 501 may be a low power multi-core processor, such as an ultra-low voltage processor, and may act as a main processing unit and central hub for communication with the various components of the system. Such processor can be implemented as a system on chip (SoC). The processor(s) 501 are configured to execute instructions for performing the operations and steps discussed herein. The data processing system 500 may further include a graphics/display subsystem 504, which may include a display controller, a graphics processor, and/or a display device. In one embodiment at least a portion of the graphics/display subsystem 504 is integrated into the processors(s) 501. The graphics/display subsystem 504 is optional and some embodiments may not include one or more components of the graphics/display subsystem 504.

The processor(s) 501 communicates with memory 503, which in one embodiment can be implemented via multiple memory devices to provide for a given amount of system memory. The memory 503 may include one or more volatile storage (or memory) devices such as random access memory (RAM), dynamic RAM (DRAM), synchronous DRAM (SDRAM), static RAM (SRAM), or other types of storage devices. The memory 503 may store information including sequences of instructions that are executed by the one or more processor(s) 501 or any other device. For example, executable code and/or data of a variety of operating systems, device drivers, firmware (e.g., input output basic system or BIOS), and/or applications can be loaded in the memory 503 and executed by one of the processor(s) 501. The operating system can be any kind of operating system such as, for example, Windows® operating system from Microsoft®, Mac OS®/iOS® from Apple, Android® from Google®, Linux®, Unix®, or other real-time or embedded operating systems such as VxWorks.

The data processing system 500 may further include I/O devices such as a network interface device(s) 505, input device(s) 506, and other I/O device(s) 507. Some of the input device(s) 506 and other I/O device(s) 507 may be optional and are excluded in some embodiments. The network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 506 may include a mouse, a touch pad, a touch sensitive screen (which may be integrated with a display device of the graphics/display subsystem 504), a pointer device such as a stylus, and/or a keyboard (e.g., physical keyboard or a virtual keyboard displayed as part of a touch sensitive screen). For example, the input device(s) 506 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The other I/O device(s) 507 may also include an audio device. An audio device may include a speaker and/or a microphone to facilitate voice-enabled functions, such as voice recognition, voice replication, digital recording, and/or telephony functions. The other I/O device(s) 507 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of data processing system 500.

To provide for persistent storage of information such as data, applications, one or more operating systems and so forth, a mass storage (not shown) may also couple to the processor(s) 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 501, e.g., via a serial peripheral interface (SPI). This flash device may provide for non-volatile storage of system software, including a basic input/output software (BIOS) as well as other firmware of the system.

The storage device(s) 508 may include computer-readable storage medium 509 (also known as a machine-readable storage medium) on which is stored one or more sets of instructions or software embodying any one or more of the methodologies or functions described herein. The computer-readable storage medium 509 may also be used to store the same software functionalities described above persistently. While the computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 500 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

Embodiments of the present invention are not described with reference to any particular programming language. It will be appreciated that a variety of programming languages may be used to implement the teachings of embodiments of the invention as described herein.

What is claimed is:

1. A computer implemented method of generating a dynamic upgrade prediction comprising:
    generating an initial upgrade prediction for a predicted time of an upgrade to be performed on a subset of a plurality of component nodes of a multi-component product;
    performing a real time progress review, using a centralized management node, of the upgrade, wherein each of the plurality of component nodes includes a plurality of stages;
    performing an upgrade duration comparison between the initial upgrade prediction and a real time upgrade time for a subset of the plurality of stages; and
    generating an updated upgrade prediction for the upgrade of the multi-component product based on the upgrade duration comparison between the initial upgrade prediction and the real time upgrade time, wherein generating the updated upgrade prediction varies based on whether the upgrade duration comparison indicates that the initial upgrade prediction was an overestimation or an underestimate as compared to the real time upgrade time,
    wherein the initial upgrade prediction, Tinit, is generated according to:

$$T_{init} = \sum_{m=1}^{M} \sum_{n=1}^{N[m]} T[m][n],$$

wherein M is a number of component nodes of the multi-component product, each component node has N[m] stages, and T[m][n] is an estimated time expected to be spent on a stage n for a component node m, and
    wherein the updated upgrade prediction is dynamically increased when the real time progress review indicates that one of the plurality of stages spends more time than the initial upgrade prediction.

2. The computer implemented method as in claim 1, wherein only a subset of the plurality of component nodes of the multi-component product are being upgraded, and the initial upgrade prediction is generated based on an analysis of the subset of the plurality of component nodes.

3. The computer implemented method as in claim 1, wherein the updated upgrade prediction, Testimate, is generated according to:

$$T_{estimate} = \begin{cases} T_{init} - \sum_{m=1}^{x} \sum_{n=1}^{y} T[m][n] + T[x][y] - \Delta t_{xy}, & \Delta t_{xy} \leq T[x][y] \\ T_{init} - \sum_{m=1}^{x} \sum_{n=1}^{y} T[m][n] + \Delta t_{xy} * 1.1 - \Delta t_{xy}, & T[x][y] < \Delta t_{xy} < T\max[x][y] \end{cases}$$

wherein x refers to a component node of the M component nodes that is being upgraded, y refers to a stage of the N[m] stages that is being upgraded, T[x][y] refers to an estimated time expected to be spent on the stage y for the component node x, and $\Delta t_{xy}$ is an elapsed time since beginning the stage y.

4. The computer implemented method as in claim 1, wherein the initial upgrade prediction for the multi-component product is generated based on internal testing data or customer feedback.

5. A system for generating a dynamic upgrade prediction comprising:
    a multi-component product including a centralized management node and a plurality of component nodes, wherein the centralized management node comprises a memory and one or more processors that are operatively coupled to the memory, and wherein the one or more processors are configured to communicate with the plurality of component nodes and to:

generate an initial upgrade prediction for a predicted time of an upgrade to be performed on a subset of the plurality of component nodes;

perform a real time progress review of the upgrade, wherein each of the plurality of component nodes includes a plurality of stages;

perform an upgrade duration comparison between the initial upgrade prediction and a real time upgrade time for a subset of the plurality of stages; and generate an updated upgrade prediction based on the upgrade duration comparison between the initial upgrade prediction and the real time upgrade time, wherein generating the updated upgrade prediction varies based on whether the upgrade duration comparison indicates that the initial upgrade prediction was an overestimation or an underestimate as compared to the real time upgrade time, wherein the centralized management node generates the initial upgrade prediction, Tinit, according to:

$$T_{init} = \sum_{m=1}^{M} \sum_{n=1}^{N[m]} T[m][n],$$

wherein M is a number of component nodes of the multi-component product, each component node has N[m] stages, and T[m][n] is an estimated time expected to be spent on a stage n for a component node m, and wherein the updated upgrade prediction is dynamically increased when the real time progress review indicates that one of the plurality of stages spends more time than the initial upgrade prediction.

6. The system as in claim 5, wherein only a subset of the plurality of component nodes of the multi-component product are being upgraded, and the initial upgrade prediction is generated based on an analysis of the subset of the plurality of component nodes.

7. The system as in claim 5, wherein the updated upgrade prediction, Testimate, is generated according to:

$$T_{estimate} = \begin{cases} T_{init} - \sum_{m=1}^{x} \sum_{n=1}^{y} T[m][n] + T[x][y] - \Delta t_{xy}, & \Delta t_{xy} \leq T[x][y] \\ T_{init} - \sum_{m=1}^{x} \sum_{n=1}^{y} T[m][n] + \Delta t_{xy} * 1.1 - \Delta t_{xy}, & T[x][y] < \Delta t_{xy} < T\max[x][y] \end{cases}$$

wherein x refers to a component node of the M component nodes that is being upgraded, y refers to a stage of the N[m] stages that is being upgraded, T[x][y] refers to an estimated time expected to be spent on the stage y for the component node x, and $\Delta t_{xy}$ is an elapsed time since beginning the stage y.

8. The system as in claim 5, wherein the initial upgrade prediction for the multi-component product is generated based on internal testing data or customer feedback.

9. A non-transitory computer-readable medium storing instructions which, when executed by one or more processors, cause the one or more processors to perform dynamic upgrade prediction operation, the operation comprising:

generating an initial upgrade prediction for a predicted time of an upgrade to be performed on a subset of a plurality of component nodes of a multi-component product;

performing a real time progress review, using a centralized management node, of the upgrade, wherein each of the plurality of component nodes includes a plurality of stages;

performing an upgrade duration comparison between the initial upgrade prediction and a real time upgrade time for a subset of the plurality of stages; and generating an updated upgrade prediction for the upgrade of the multi-component product based on the upgrade duration comparison between the initial upgrade prediction and the real time upgrade time, wherein generating the updated upgrade prediction varies based on whether the upgrade duration comparison indicates that the initial upgrade prediction was an overestimation or an underestimate as compared to the real time upgrade time, wherein the initial upgrade prediction, Tinit, is generated according to:

$$T_{init} = \sum_{m=1}^{M} \sum_{n=1}^{N[m]} T[m][n],$$

wherein M is a number of component nodes of the multi-component product, each component node has N[m] stages, and T[m][n] is an estimated time expected to be spent on a stage n for a component node m, and wherein the updated upgrade prediction is dynamically increased when the real time progress review indicates that one of the plurality of stages spends more time than the initial upgrade prediction.

10. The non-transitory computer-readable medium as in claim 9, wherein only a subset of the plurality of component nodes of the multi-component product are being upgraded, and the initial upgrade prediction is generated based on an analysis of the subset of the plurality of component nodes.

11. The non-transitory computer-readable medium as in claim 9, wherein the updated upgrade prediction, Testimate, is generated according to:

$$T_{estimate} = \begin{cases} T_{init} - \sum_{m=1}^{x} \sum_{n=1}^{y} T[m][n] + T[x][y] - \Delta t_{xy}, & \Delta t_{xy} \leq T[x][y] \\ T_{init} - \sum_{m=1}^{x} \sum_{n=1}^{y} T[m][n] + \Delta t_{xy} * 1.1 - \Delta t_{xy}, & T[x][y] < \Delta t_{xy} < T\max[x][y] \end{cases}$$

wherein x refers to a component node of the M component nodes that is being upgraded, y refers to a stage of the N[m] stages that is being upgraded, T[x][y] refers to an estimated time expected to be spent on the stage y for the component node x, and $\Delta t_{xy}$ is an elapsed time since beginning the stage y.

12. The non-transitory computer-readable medium as in claim 9, wherein the initial upgrade prediction for the multi-component product is generated based on internal testing data or customer feedback.

13. The computer implemented method as in claim 1, wherein responsive to determining that the initial upgrade prediction is an overestimation as compared to the real time upgrade time, a modification to the initial upgrade prediction to generate the updated upgrade prediction is limited to an upgrade variation associated with a current stage of the plurality of stages being executed.

14. The non-transitory computer-readable medium as in claim 9, wherein responsive to determining that the initial upgrade prediction is an overestimation as compared to the real time upgrade time, a modification to the initial upgrade prediction to generate the updated upgrade prediction is limited to an upgrade variation associated with a current stage of the plurality of stages being executed.

* * * * *